US010607598B1

(12) United States Patent
Larson et al.

(10) Patent No.: US 10,607,598 B1
(45) Date of Patent: Mar. 31, 2020

(54) DETERMINING INPUT DATA FOR SPEECH PROCESSING

(71) Applicant: Capital One Services, LLC, McLean, VA (US)

(72) Inventors: Christopher Larson, Washington, DC (US); Tarek Aziz Lahlou, McLean, VA (US); Diana Mingels, Washington, DC (US); Zachary Kulis, Washington, DC (US); Erik T. Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/522,119

(22) Filed: Jul. 25, 2019

Related U.S. Application Data

(60) Provisional application No. 62/830,041, filed on Apr. 5, 2019.

(51) Int. Cl.
| | |
|---|---|
| *G10L 15/06* | (2013.01) |
| *G10L 15/26* | (2006.01) |
| *G06N 3/08* | (2006.01) |
| *G06N 20/00* | (2019.01) |
| *G10L 15/07* | (2013.01) |

(52) U.S. Cl.
CPC .............. *G10L 15/063* (2013.01); *G06N 3/08* (2013.01); *G06N 20/00* (2019.01); *G10L 15/07* (2013.01); *G10L 15/26* (2013.01)

(58) Field of Classification Search
None
See application file for complete search history.

(56) References Cited

U.S. PATENT DOCUMENTS

| 6,101,492 A | * | 8/2000 | Jacquemin | .......... G06F 16/3338 |
| | | | | 707/688 |
| 7,028,038 B1 | | 4/2006 | Pakhomov | |
| 7,089,188 B2 | * | 8/2006 | Logan | ................... G06F 16/685 |
| | | | | 704/270 |

(Continued)

OTHER PUBLICATIONS

Prenger R, Valle R, Catanzaro B. WaveGlow: A Flow-based Generative Network for Speech Synthesis. arXiv preprint arXiv: 1811. 00002. Oct. 2018 (Year: 2018).*

(Continued)

*Primary Examiner* — Jonathan C Kim
(74) *Attorney, Agent, or Firm* — Banner & Witcoff, Ltd.

(57) ABSTRACT

Aspects described herein may relate to the determination of data that is indicative of a greater range of speech properties than input text data. The determined data may be used as input to one or more speech processing tasks, such as model training, model validation, model testing, or classification. For example, after a model is trained based on the determined data, the model's performance may exhibit more resilience to a wider range of speech properties. The determined data may include one or more modified versions of the input text data. The one or more modified versions may be associated with the one or more speakers or accents and/or may be associated with one or more levels of semantic similarity in relation to the input text data. The one or more modified versions may be determined based on one or more machine learning algorithms.

20 Claims, 7 Drawing Sheets

(56) References Cited

U.S. PATENT DOCUMENTS

| | | | | |
|---|---|---|---|---|
| 7,280,963 | B1* | 10/2007 | Beaufays | G10L 15/06 704/236 |
| 9,037,464 | B1* | 5/2015 | Mikolov | G06F 17/2785 704/255 |
| 9,697,201 | B2* | 7/2017 | Gao | G06F 17/289 |
| 2003/0187649 | A1* | 10/2003 | Logan | G06F 16/685 704/260 |
| 2005/0080780 | A1* | 4/2005 | Colledge | G06F 17/2785 |
| 2006/0047632 | A1* | 3/2006 | Zhang | G06F 16/367 |
| 2007/0136251 | A1* | 6/2007 | Colledge | G06F 16/3338 |
| 2008/0270344 | A1* | 10/2008 | Yurick | G06F 16/61 |
| 2009/0319521 | A1* | 12/2009 | Groeneveld | G06F 16/951 |
| 2011/0295605 | A1* | 12/2011 | Lin | G10L 15/08 704/251 |
| 2013/0204885 | A1* | 8/2013 | Clinchant | G06K 9/4676 707/756 |
| 2015/0186504 | A1* | 7/2015 | Gorman | G06F 16/24522 707/752 |
| 2016/0049144 | A1* | 2/2016 | Conkie | G10L 13/08 704/234 |
| 2016/0062979 | A1* | 3/2016 | Mote | G06F 17/27 704/9 |
| 2016/0147740 | A1* | 5/2016 | Gao | G06F 17/289 704/2 |
| 2016/0203130 | A1* | 7/2016 | Roque | G06F 17/2705 707/741 |
| 2017/0091170 | A1* | 3/2017 | Cardillo | G06F 17/2795 |
| 2018/0032606 | A1* | 2/2018 | Tolman | G06F 16/93 |
| 2018/0130465 | A1* | 5/2018 | Kim | G10L 15/22 |
| 2019/0065460 | A1* | 2/2019 | Xin | G06F 17/278 |
| 2019/0065471 | A1* | 2/2019 | Comeau | G06F 17/2795 |
| 2019/0188326 | A1* | 6/2019 | Daianu | G06F 17/28 |
| 2019/0236464 | A1* | 8/2019 | Feinson | G06N 20/00 |
| 2019/0295536 | A1* | 9/2019 | Sapugay | G06F 17/2705 |

OTHER PUBLICATIONS

Devlin J, Chang MW, Lee K, Toutanova K. Bert: Pre-training of deep bidirectional transformers for language understanding. arXiv preprint arXiv:1810.04805. Oct. 11, 2018. (Year: 2018).*

Tirthajyoti Sarkar, "Synthetic data generation—a must-have skill for new data scientists", Towards Data Science, Dec. 19, 2018 [retrieved from https://towardsdatascience.com/synthetic-data-generation-a-must-have-skill-for-new-data-scientists-915896c0c1ae].

Hartmann S., Eckle-Kohler J., and Gurevych I., "Generating Training Data for Semantic Role Labeling based on Label Transfer from Linked Lexical Resources", Trans. Assoc. Computational Linguistics, V. 4, pp. 197-216, 2016 [retrieved from: https://www.aclweb.org/anthology/Q16-1015].

Krizhevsky A., Sutskever I., and Hinton G.E., "ImageNet Classification with Deep Convolutional Neural Networks", Advances in Neural Information Processing Systems, V25 (2012), pp. 1097-1105, [retrieved from http://papers.nips.cc/paper/4824-imagenet-classification-with-deep-convolutional-neural-networks.pdf].

Ratner A., De Sa C., Wu S., Selsam D., Ré C., "Data Programming: Creating Large Training Sets, Quickly", Advances in Neural Information Processing Systems, V29 (2016), pp. 3567-3575 [retrieved from https://www.ncbi.nlm.nih.gov/pmc/articles/PMC5985238/].

Vaswani A., Shazeer N., Parmar N., Uszkoreit J., Jones L., Gomez A. N., Kaiser L., and Polosukhin I., "Attention is All You Need", (2017) arXiv preprint arXiv:1706.03762 [retrieved from https://arxiv.org/abs/1706.03762v5].

Devlin J., Chang M-W., Lee K., and Toutanova K., "BERT: Pre-training of deep bidirectional transformers for language understanding", (2018) arXiv preprint arXiv:1810.04805 [retreived from https://arxiv.org/abs/1810.04805v2].

Radford A., Wu J., Child R., Luan D., Amodei D., and Sutskever I., "Language models are unsupervised multitask learners." OpenAI Blog, 1, No. 8 (2019) [retrieved from https://www.techbooky.com/wp-content/uploads/2019/02/Better-Language-Models-and-Their-Implications.pdf].

Serdyuk D., Wang Y., Fuegen C., Kumar A., Liu B., and Bengio Y., "Towards end-to-end spoken language understanding," (2018) arXiv preprint arXiv:1802.08395 [retreived from https://arxiv.org/abs/1802.08395v1].

Chung Y-A. and Glass J., "Speech2vec: A sequence-to-sequence framework for learning word embeddings from speech", (2018) arXiv preprint arXiv:1803.08976 [retreived from https://arxiv.org/abs/1803.08976v2].

Kim, Y., Jernite, Y., Sontag, D., and Rush, A. M., "Character-Aware Neural Language Models", (2015) arXiv preprint arXiv:1508.06615 [retrieved from https://arxiv.org/abs/1508.06615v4].

Wang Y., Skerry-Ryan R.J., Stanton D., Wu Y., Weiss R.J., Jaitly N., Yang Z., Xiao Y., Chen Z., Bengio S., Le Q., Agiomyrgiannakis Y., Clark R., and Saurous R.A., "Tacotron: Towards end-to-end speech synthesis", (2017) arXiv preprint arXiv:1703.10135 [retreived from https://arxiv.org/abs/1703.10135v2].

Prenger R., Valle R., and Catanzaro B., "Waveglow: A flow-based generative network for speech synthesis", In ICASSP 2019-2019 IEEE International Conference on Acoustics, Speech and Signal Processing (ICASSP) (pp. 3617-3621), IEEE, (May 2019) [retrieved from https://arxiv.org/abs/1811.00002v1].

Kominek J., Black A. W., and Ver V., "CMU Arctic databases for speech synthesis", Tech. Rep., (2003) [retrieved from http://citeseerx.ist.psu.edu/viewdoc/summary?doi=10.1.1.64.8827].

Ito, Keith, "The LJ Speech Dataset", (2017) [retrieved from https://keithito.com/LJ-Speech-Dataset/].

McInnes L., Healy J., and Melville J., "Umap: Uniform manifold approximation and projection for dimension reduction", (2018) arXiv preprint arXiv:1802.03426 [retreived from https://arxiv.org/abs/1802.03426v2].

Luo H., Jiang L., Belinkov Y., and Glass J., "Improving Neural Language Models by Segmenting, Attending, and Predicting the Future", (2019) arXiv preprint arXiv:1906.01702 [retreived from https://arxiv.org/abs/1906.01702v1].

* cited by examiner

DETERMINING INPUT DATA FOR SPEECH PROCESSING

CROSS-REFERENCE TO RELATED APPLICATIONS

The present application claims the benefit of U.S. provisional application No. 62/830,041, filed Apr. 5, 2019, and having the same title. The above-mentioned application is incorporated by reference herein in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to speech processing. More specifically, aspects of the disclosure may provide for the determination of input data that may be used as a basis for training a model for speech processing, validating a model for speech processing, testing a model for speech processing, or determining a classification for speech data.

BACKGROUND

There are numerous challenges to designing a speech processing system. Conventional speech processing systems may use a model that includes one or more neural networks or other machine learning algorithm. The performance of these models may depend on the manner in which the model is trained. Training may be dependent on the quality of the training set. For example, conventional training techniques may train the model based on batches of correlated training data. The model, after training is complete, may perform accurately when input data has similar speech properties as the batches of training data. However, humans have a wide range of speaking accents, speaking styles, and/or vocal irregularities. Thus, the input data may have different speech properties than the batches of training data. Performance of the model may degrade based on the different speech properties of the input data. For at least this reason, conventional training techniques may be inadequate.

As another example of the challenges to designing a speech processing system, some speech processing tasks may be to classify speech data by associating the speech data with one or more categories or other type of classification. One example of a classification technique is intent classification. Performance of the classification, however, may be dependent on the amount of noise or errors present in the input. For example, classification may include converting speech data to text data based on an automated speech recognition (ASR) process. The ASR process may have introduced an error such as by recognizing one of the spoken words incorrectly (e.g., the spoken word "night" may have been determined as the word "knight" by the ASR process). This error may cause the determination of an incorrect classification. For at least this reason, conventional classification techniques may be inadequate.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein may address one or more inadequacies of conventional techniques, including those mentioned above. Further, aspects described herein may address one or more other problems, and may generally improve the quality, efficiency, and speed of speech processing systems.

For example, aspects described herein may relate to the determination of data that is indicative of a greater range of speech properties than input text data. The determined data may be used as input to one or more speech processing tasks, such as a model training task, a model validation task, a testing task, or a classification task. After a model is trained based on the determined data, the model's performance may exhibit more resilience to a wider range of speech properties. Based on validating a model based on the determined data, the model's performance may indicate the model's resilience to a wider range of speech properties. Further, the performance of a classification task may exhibit more resilience to error or noise.

Based on one or more aspects described herein, for example, one or more computing devices may configure a first modification pipeline to process its input based on one or more speakers or accents. The one or more computing devices may configure a second modification pipeline to perform a determination that processes its input based on one or more levels of semantic similarity. Based on configuration of the first and second modification pipelines, the one or more computing devices may be configured to determine data that can be used as input to one or more speech processing tasks. For example, the one or more computing devices may receive input text data and, based on the input text data, may determine hierarchical data. Based on the hierarchical data, the one or more computing devices may determine sampled data. The one or more computing devices may process the sampled data based on one or more of the first modification pipeline and the second modification pipeline. Based on the processing of the sampled data, the one or more computing devices may determine modified data. The modified data may, for example indicate one or more different words from the input text data and/or text indicated by the sampled data. The one or more computing devices may, based on the modified data, determine output data. The output data may, for example, include one or more modified versions of the input text data. The one or more modified versions may be associated with the one or more speakers or accents and/or may be associated with the one or more levels of semantic similarity in relation to the input text data. In this way, the output data may be indicative of a greater range of speech properties than the input text data. The one or more computing devices may send the output data for use as input to one or more speech processing tasks.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for determining input data for speech processing. For example, based on the methods and techniques described herein, training data may be processed and modified to determine a larger and/or more robust set of training data. The set of training data, as compared to the original training data, may be larger in its sample set, may include a larger or different range of words, may include a larger or different range of errors, and/or may be based on a larger sampling of human accents and/or voices. After a model is trained based on this set of training data, the model's performance may exhibit more resilience to a wider range of speech properties.

As another example, based on the methods and techniques described herein, validation data may be processed and modified to determine a larger and/or more robust set of validation data. The set of validation data, as compared to the original validation data, may be larger in its sample set, may include a larger or different range of words, may include a larger or different range of errors, and/or may be based on a larger sampling of human accents and/or voices. When a model is validation based on this set of validation data, the model's performance may indicate the model's resilience to a wider range of speech properties. The methods and techniques described herein could similarly be applied to testing data.

As another example, based on the methods and techniques described herein, speech data may be converted by an automated speech recognition (ASR) process to text data. The text data may be processed to determine modified data. The modified data may indicate one or more different words than the text data. Multiple potential classifications may be determined by classifying the text data and/or the modified data. A classification for the speech data may be determined based on which classification was most common in the multiple potential classifications. In this way, the performance of the classification task may exhibit more resilience to error or noise. These aspects, among others, will be discussed in greater detail below and based on the accompanying drawings.

Figure 1:
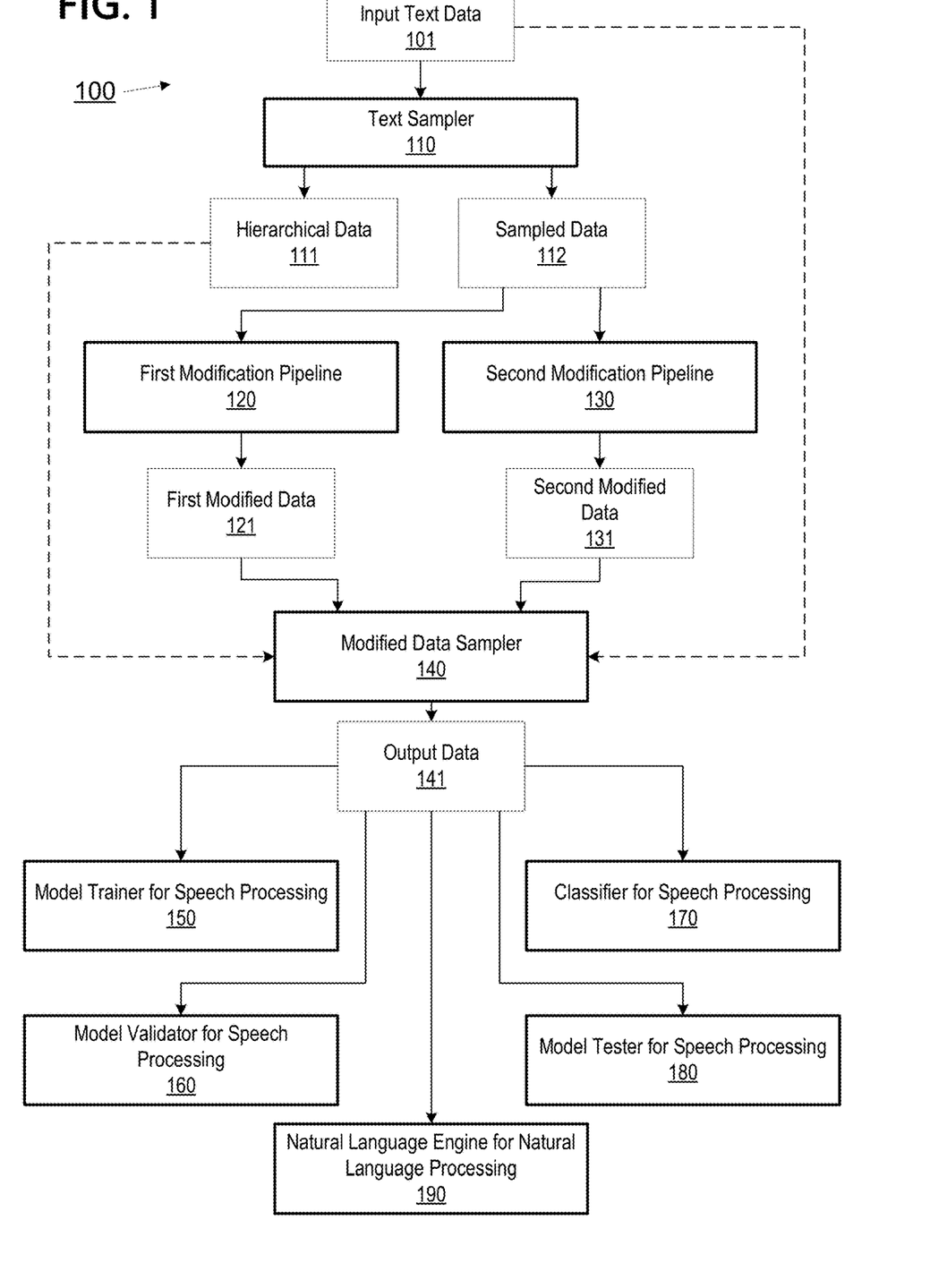
FIG. 1 depicts a block diagram of an example framework that determines input data for speech processing.

FIG. 1 depicts a block diagram of an example framework that determines input data for speech processing. To provide illustrative examples of the aspects described throughout this disclosure, the example framework 100 of FIG. 1 will be discussed based on the examples of FIGS. 2A-2G. Indeed, the examples of FIGS. 2A-2G may be used to implement various aspects of the example framework 100.

As a brief overview, the example framework 100 illustrates a process where input text data 101 may be processed to determine output data 141. The output data 141 may be provided, as input, to one or more speech processing tasks. The one or more speech processing tasks may include, for example, a training task performed by a model trainer 150, a validation task performed by a model validator 160, a classification task performed by a classifier 170, a testing task performed by a model tester 180, and a natural language understanding task performed by natural language engine 190.

As compared to the input text data 101, the text data indicated by the output data 141 may be different from the input text data 101. For example, as compared to the input text data 101, text data indicated by the output data 141 may include one or more additional words, one or more additional characters, one or more different words, or one or more different characters. These additional or different words/characters may cause, for example, one or more spelling mistakes, one or more homophones, or one or more semantic changes to manifest in the text data indicated by the output data 141. Further, as compared to the input text data 101, the output data 141 may indicate two or more modified versions of the input text data 101. For example, if the input text data 101 includes a single sentence, the output data 141 may include two or more sentences. Each of the two or more sentences may be different from the single sentence of the input text data 101 and different from the other sentences of the two or more sentences.

Throughout this disclosure, the input text data 101 will be discussed based on the following example sentence: "The quick brown fox jumped over the lazy dog." Based on this example sentence, the output data 141 may indicate one or more modified versions of the example sentence. In general, however, the input text data 101 and the text data indicated by the output data 141 may be any form of text data including, for example, one or more characters, one or more words, or one or more sentences. The exact form may depend what form of input is expected by a speech processing task. For example, a training process for a model may expect one or more words as input. Accordingly, the input text data 101 and the text data indicated by the output data 141 may take the form of one or more words.

Table I provides examples of the text data indicated by the output data 141. The examples of Table I may be determined based on processing the example sentence, "The quick brown fox jumped over the lazy dog." The examples of Table I illustrate various differences between the input text data 101 and the text data indicated by the output data 141. The examples of Table I will be discussed throughout this disclosure as a way to illustrate various aspects of the methods and techniques described herein.

TABLE I

Examples of text data indicated by the output data 141

| | |
|---|---|
| First Example | The quick brown fox jumped over the lazie dog. |
| Second Example | The quick braun fox lumped over the lazi dog. |
| Third Example | The quack brown fox jumped over the lizzi dog. |
| Fourth Example | The quick brown fox jump over the lazie dog. |
| Fifth Example | The speedy dark-brown fox jumped over the sleepy dog. |
| Sixth Example | The nimble grey fox leaped across the work-shy puppy. |
| Seventh Example | The spry brownish fox jumped across the slothful hound. |
| Eighth Example | The fast browned fox bound over the otiose dog. |

Figure 2A:
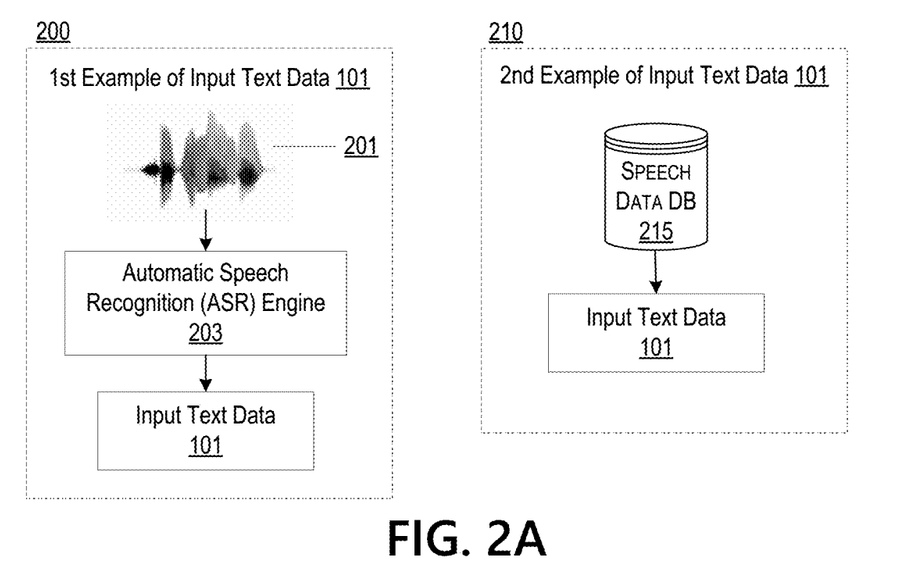
FIGS. 2A-2G depict examples that may be used to implement various aspects of the example framework that determines input data for speech processing.

As indicated by the example framework 100, the output data 141 may be determined based on processes performed by a text sampler 110, a first modification pipeline 120, a second modification pipeline 130, and a modified data sampler 140. The text sampler 110 may be configured to receive, as input, the input text data 101. The input text data 101 may, for example, be a textual representation of input speech, may be usable as training data for a model, may be usable as validation data for a model, or may be usable as testing data for a model. FIG. 2A provides examples of the input text data 101. As depicted in the first example 200 of the input text data 101, input speech 201 (e.g., an audio signal received by the speech processing system via a microphone) may be processed via a speech-to-text converter 203. Based on the processing of the ASR engine 203, the input text data 101 may be determined. In this way, the input text data 101 may be a textual representation of the input speech 201. As depicted in the second example 210 of the input text data 101, the input text data 101 may be retrieved from a speech data database 215. The speech data database 215 may include text data configured as training data for a model, validation data for a model, and/or testing data for a model. For example, the speech data database 215 may include the Penn Treebank (PTB) corpus, which includes approximately 50,000 sentences compiled by transcribing speech collected via telephone, news-wire, microphone, and other sources.

Figure 2B:
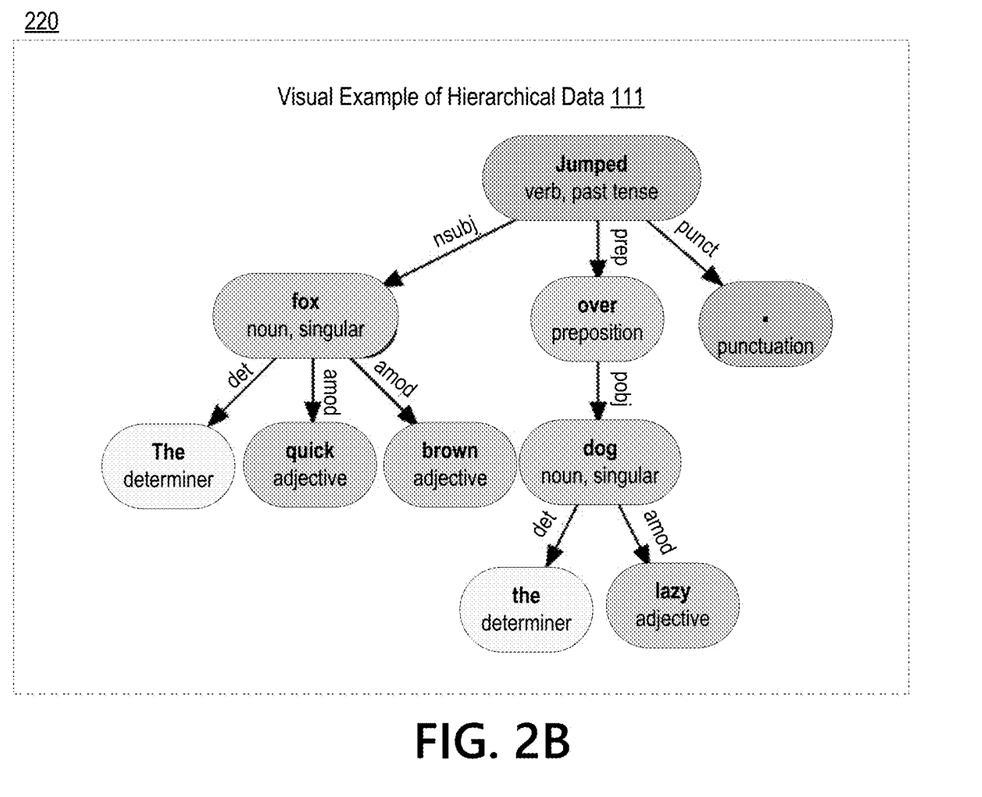

Based on receiving the input text data 101, the text sampler 110 may determine hierarchical data 111 and sampled data 112. The hierarchical data 111 may include a nodal representation of the input text data such as, for example, a directed graph representation of the input text data 101. To determine the nodal representation, the text sampler 110 may be configured with a dependency parser that, for example, analyzes the grammatical structure of the input text data 101, establishes one or more relationships between "head" words and words that modify the head words. For example, the nodal representation may, for a sentence, include a node for each word and a node for each punctuation character. Further, each node may be associated with semantic information and/or grammatical information determined by the text sampler. FIG. 2B provides a visual example 220 of the hierarchical data 111. As shown, the example sentence ("The quick brown fox jumped over the lazy dog.") is represented by a directed graph of nodes. Each node is for a word or a punctuation character of the example sentence. The word "jumped" may be determined as one of the "head" words and, thus, is at the top level of the directed graph of nodes. Further, each node may be associated with semantic and/or grammatical information. As shown, the semantic and/or grammatical information may indicate whether a word is a verb, noun, adjective, preposition, or determiner. As shown, the semantic and/or grammatical information may indicate whether the word is singular, plural, past tense, present tense, or future tense. As shown, the semantic and/or grammatical information may indicate a punctuation character. Each link between two nodes is also shown by the visual example as being associated with semantic and/or grammatical information. For example, as shown, the link between the nodes for "jumped" and "fox" may indicate that the link is directed to a node for a noun and the subject of the example sentence (e.g., "nsubj" as shown in FIG. 2B). The link between the nodes for "jumped" and "over" may indicate that the link is directed to a node for a preposition (e.g. "prep" as shown in FIG. 2B). The link between the nodes for "jumped" and "." may indicate that the link is directed to a node for punctuation (e.g., "punct" as shown in FIG. 2B). The link between the nodes for "fox" and "brown" may indicate that the link is directed to a node for an adjective that modifies another word (e.g., "amod" as shown in FIG. 2B). The link between the nodes for "fox" and "The" may indicate that the link is directed to a node for a determiner (e.g., "det" as shown in FIG. 2B). The link between the nodes for "over" and "dog" may indicate that the link is directed to a node for an object that is associated with a preposition (e.g., "pobj" as shown in FIG. 2B).

The text sampler 110 may be configured to determine the sampled data 112 based on the hierarchical data 111. The sampled data 112 may include a subset of text from the input text data 101 and/or a subset of the nodes from the hierarchical data. The sampled data 112 may be in the form of text data (e.g., the text data of the subset of text) or node data (e.g., data indicating the subset of nodes that includes an indication of the associated word, the associated semantic and/or grammatical information, and/or one or more associated links). The determination of the sampled data 112 may be performed based on the semantic and/or grammatical information of the hierarchical data 111. For example, the sampled data 112 may be determined based on whether the word is a verb, adjective, noun, or the like. As one example, the sampled data 112 may include any word that is an adjective or verb (e.g., "jumped", "quick", "brown", and "lazy"). Looking to the examples of Table I, the first four examples may have been determined based on sampled data 112 that includes any adjective or verb of the example sentence. Further, the sampled data 112 may be determined based on whether the word is determined as a "head" word or the links between two nodes. As one example, the sampled data 112 may include any "head" word (e.g., "jumped"). Further, the sampled data 112 may be determined based on the first modification pipeline 120 and the second modification pipeline 130. For example, the sampled data 112 may include a first portion of sampled data for the first modification pipeline 120 (e.g., data indicating any adjective and verb of the example sentence such as "jumped", "quick", "brown", and "lazy"), and may include a second portion of sampled data for the second modification pipeline 130 (e.g., data indicating each word of the example sentence, excluding determiners).

The sampled data 112, or respective portions thereof, may be provided as input and processed by one or more of the first modification pipeline 120 and the second modification pipeline 130. As shown by the example framework 100, the sampled data 112 is provided as input to and processed by both the first modification pipeline 120 and the second modification pipeline 130.

The first modification pipeline 120 may be configured with a text-to-speech converter and a speech-to-text converter. The text-to-speech converter may be configured to determine, based on the sampled data 112, one or more sets of audio data. Further, the text-to-speech converter may be configured to determine the one or more sets of audio data based on one or more speakers or accents. In other words, each set of audio data may be associated with a respective speaker or accent. In this way, the text indicated by the sampled data 112 (e.g., "jumped", "quick", "brown", and "lazy") may be represented by the one or more sets of audio data as if the text was being spoken based on the one or more speakers or accents.

The speech-to-text converter may be configured to determine, based on the one or more sets of audio data, first modified data 121. The first modified data 121 may be determined based on the one or more speakers or accents. Further, as compared to the text indicated by the sampled data 112, the first modified text data 121 may indicate one or more different words or spellings from the text indicated by the sampled data 112. For example, the first four examples of Table I may have been determined based on the first modified data 121. If the first four examples of Table I are compared to the example sentence (e.g., "The quick brown fox jumped over the lazy dog."), some differences are apparent. In the first four examples of Table I, the word "quick" has been changed to "quack" in the third example; the word "brown" has been changed to "braun" in the second example; the word "jumped" has been changed to "lumped" in the second example and "jump" in the fourth example; and "lazy" has been changed to "lazie" in the first example, "lazi" in the second example, "lizzi" in the third example, and "lazie" in the fourth example. Thus, to determine the first four examples of Table I, the first modified data 121 may indicate words such as "braun", "lumped", "lazie", "lazi", "lizzi", and "lazie".

Figure 2C:
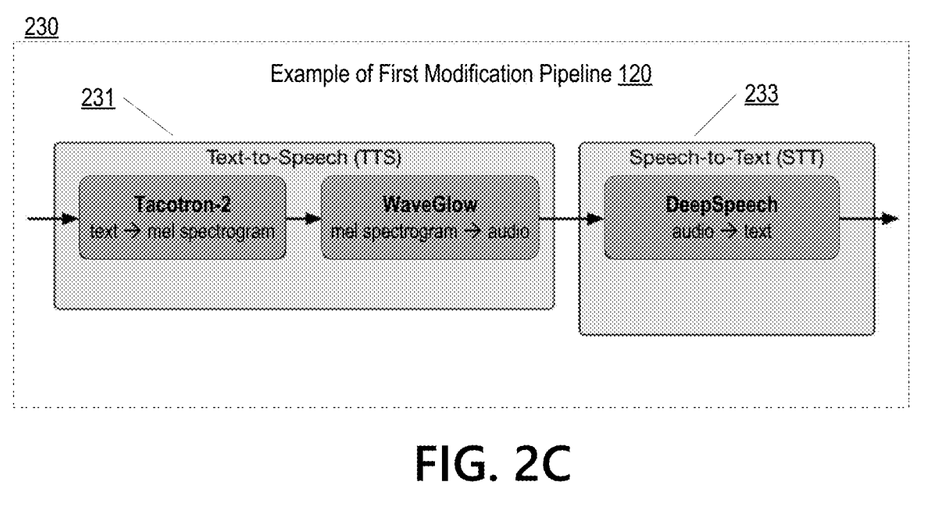

FIG. 2C provides an example 230 of the first text modification pipeline 120. As indicated by the example 230, the text-to-speech converter 231 may include one or more model pairs (e.g., the illustrated model pair being a Tacotron-2 and WaveGlow model pair). Each model pair may include a first model that determines a mel spectrogram representation of input text, and a second model that determines audio data based on the mel spectrogram representation determined by the first model. The first model may be a Tacotron-2 model. The second model may be a WaveGlow model. Further details on Tacotron-2 are described in Y. Wang, R. Skerry-Ryan, D. Stanton, Y. Wu, R. J. Weiss, N. Jaitly, Z. Yang, Y. Xiao, Z. Chen, S. Bengio, Q. Le, Y. Agiomyrgiannakis, R. Clard, and R. A. Saurous, "Tacotron: Towards end-to-end speech synthesis", 2017, available at https://arxiv.org/abs/1703.10135, and which is incorporated herein by reference. Further details on WaveGlow are described in R. Prenger, R. Valle, and B. Catanzaro, "Waveglow: A flow-based generative network for speech synthesis, 2018, available at https://arxiv.org/abs/1811.00002, and which is incorporated herein by reference.

Further, the text-to-speech converter may include a model pair for each speaker or accent. For example, if the text-to-speech converter 231 is to determine audio data based on four speakers or accents, the text-to-speech converter 231 may include four model pairs and each model pair may be trained for its respective speaker or accent. More fully, for a model pair and a particular speaker or accent, the Tacotron-2 model may be trained based on the particular speaker or accent and, therefore, may determine a mel spectrogram representation based on the particular speaker or accent. Similarly, for the model pair and a particular speaker or accent, the WaveGlow model may be trained based on the particular speaker or accent and, therefore, may determine audio as if the text was spoken by the particular speaker or accent. Again looking to the examples of Table I, if the first four examples of Table I are determined based on the first modified data 121 and if the text-to-speech converter 231 is configured to determine audio data based on four speakers or accents, each of the first four examples of Table I may be based on a respective speaker or accent from the four speakers or accents. For example, the first modified data 121 may indicate the word "lazie" of the first example based on the processing performed by a first model pair and based on a first speaker or accent. The first modified data 121 may indicate the words "braun", "lumped", and "lazie" of the second example based on the processing performed by a second model pair and based on a second speaker or accent. The first modified data 121 may indicate the words "quack" and "lizzi" of the third example based on the processing performed by a third model pair and based on a third speaker or accent. The modified data 121 may indicate the words "jump" and "lazie" of the fourth example based on the processing performed by a fourth model pair and based on a fourth speaker or accent.

As indicated by the example 230, the speech-to-text converter 233 may include an engine configured to determine text based on any audio data determined by a model pair of the text-to-speech converter. As shown by the example 230, the engine may be a deep learning speech-to-text engine such as DeepSpeech. DeepSpeech is an open source model that uses stacked recurrent neural networks (RNNs) and a connectionist temporal classification (CTC) loss function to handle alignment. Further details on DeepSpeech are described in Y. Kim, Y. Jernite, D. Sontag, and A. M. Rush, "Character-aware neural language models", 2015, available at https://arxiv.org/abs/1508.06615, and which is incorporated herein by reference.

Based on the text determined by DeepSpeech, the first modified data 121 may be based on the one or more sets of audio data determined by the one or more model pairs of the text-to-speech converter. For example, if the text-to-speech converter is configured to determine audio data based on four speakers, the first modified data 121 may indicate text for each of the four speakers: a first set of text based on the processing performed by a first model pair and based on a first speaker or accent; a second set of text based on the processing performed by a second model pair and based on a second speaker or accent; a third set of text based on the processing performed by a third model pair and based on a third speaker or accent; and a fourth set of text based on the processing performed by a fourth model pair and based on a fourth speaker or accent.

The second modification pipeline 130 may be configured to determine second modified data 131 based on a determination that processes the sampled data 112 based on one or more levels of semantic similarity. For example, if the second modification pipeline 130 is configured to receive, as input, one or more words, the second modification pipeline 130 may determine the second modified data 131 to indicate one or more modified words that are semantically similar to the one or more words. The one or more levels of semantic similarity may be based on one or more trained models of the second modification pipeline 130. For example, the fifth through eighth examples of Table I may have been determined based on the second modified data 131. If the fifth through eighth examples of Table I are compared to the example sentence (e.g., "The quick brown fox jumped over the lazy dog."), some differences are apparent. In the fifth example of Table I, the word "quick" has been changed to "speedy"; the word "brown" has been changed to "darkbrown"; and the word "lazy" has been changed to "sleepy".

In the sixth example of Table I, the word "quick" has been changed to "nimble"; the word "brown" has been changed to "grey"; the word "jumped" has been changed to "leaped"; the word "over" has been changed to "across"; the word "lazy" has been changed to "work-shy"; and the word "dog" has been changed to "puppy". In the seventh example of Table I, the word "quick" has been changed to "spry"; the word "brown" has been changed to "brownish"; the word "over" has been changed to "across"; the word "lazy" has been changed to "slothful"; and the word "dog" has been changed to "hound". In the eighth example of Table I, the word "quick" has been changed to "fast"; the word "brown" has been changed to "browned"; the word "jumped" has been changed to "bound"; and the word "lazy" has been changed to "otiose". Thus, to determine the fifth to eighth examples of Table I, the second modified data 131 may indicate words such as "nimble", "grey", "leaped", "across", "work-shy", "puppy", "spry", "brownish", "slothful", "hound", "fast", "browned", "bound", and "otiose".

Figure 2D:
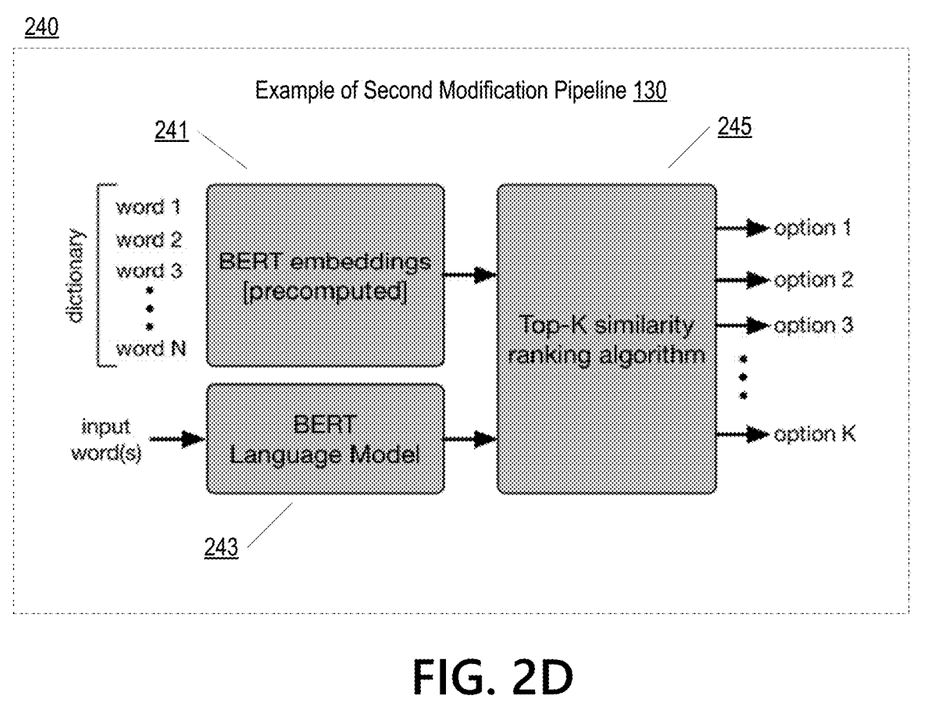

FIG. 2D provides an example 240 of the second modification pipeline 130. As indicated by the example 240, the second modification pipeline 130 includes a BERT language model 243, BERT embeddings 241, and a ranking algorithm 245. The BERT language model 243 may be configured with a multi-embedding input layer that, based on one or more words received as input, determines word-piece tokens, positional tokens, and sequence tokens; sums the various tokens, transfers the summing result(s) to fully connected transfer layers. Based on the output of the BERT language model 243, the ranking algorithm 245 may, based on the BERT embeddings 241, determine k nearest neighbors based on a look-up table. The look-up table may have been determined based on the BERT embeddings 241. For example, the BERT embeddings may have been based on a dictionary of 80,000 words. The covariance of the 80,000 words may be determined for the BERT embedding space (which may be 768 dimensions), sorting the resulting rows into descending order, and then placing words into the look-up table based on the sorted rows. Additional details on a BERT language model are described at J. Devlin, Ming-WeiChang; K. Lee, and K. Toutanova, "Bert: Pre-training of deep bidirectional transformers for language understanding", 2018, available at https://arxiv.org/pdf/1810.04805.pdf, and which is incorporated herein by reference.

Based on the processing performed by the example 240 of the second modification pipeline 130, the second modified data 131 may include a set of nearest neighbors for each word provided as input to the second modification pipeline 130. Each set may include the k nearest neighbors as determined by the ranking algorithm 245 (e.g., each set may include the 5 nearest neighbors). For example, with respect to the fifth through eighth examples of Table I, the words "speedy", "nimble", "spry", and "fast" may be from the k nearest neighbors for the word "quick"; the words "darkbrown", "grey", "brownish", and "browned" may be from the k nearest neighbors for the word "brown"; the words "leaped" and "bound" may be from the k nearest neighbors for the word "jumped"; the word "across" may be from the k nearest neighbors for the word "over"; the words "sleepy", "work-shy", "slothful", and "otiose" may be from the k nearest neighbors for the word "lazy"; and the words "puppy" and "hound" may be from the k nearest neighbors for the word "dog".

Additionally, the first modification pipeline 120 and the second modification pipeline 130 may be configured to determine the first modified data 121 and the second modified data 131 based on an iterative process. For example, output text determined by the first modification pipeline 120 based on the sampled data 112 may be sent back through one of the pipelines 120 or 130 for further processing. This process may be repeated one or more times. Similarly, the output text determined by the second modification pipeline 130 based on the sampled data 112 may be sent back through one of the pipelines 120 or 130 for further processing. This process may be repeated one or more times, as well. In this way, the first modified data 121 and the second modified data 131 may be based on two or more iterations of the first modification pipeline 120 and/or the second modification pipeline 130.

As shown by the example framework 100, the modified data sampler 140 may be configured to, based on the first modified data 121 and the second modified data 131, determine output data 141. This determination may be performed by sampling the first modified data 121 and/or the second modified data 131 to determine one or more modified data samples, and modifying the input text data 101 or the hierarchical data 111 based on the one or more modified data samples. Accordingly, as indicated by the example framework 100, the modified data sampler 140 may receive, as additional input, the hierarchical data 111 or the input text data 101. Whether the modified data sampler 140 modifies the hierarchical data 111 or the input text data 101 may be based on a speech processing task to will be performed based on the output data 141. For example, if the speech processing task is configured to receive hierarchical data, the modified data sampler 140 may be configured to modify the hierarchical data 111 based on one or more modified data samples. If the speech processing task is configured to receive text data, the modified data sampler 140 may be configured to modify the input text data 101 based on one or more modified data samples. Alternatively, if one of the example speech processing tasks is configured to receive text data, the modified data sampler 140 may be configured to modify the hierarchical data 111 based on one or more modified data samples, and determine text data based on the modified hierarchical data.

The sampling of the first modified data 121 and the second modified data 131 may be performed based on a randomized process. For example, the number of samples to determine may be randomized. Further, whether samples are determined based on the first modified data 121, the second modified data 131, or both, may be randomized. As a way to illustrate this process, the first modified data 121 and the second modified data 131 may include, based on the example sentence ("The quick brown fox jumped over the lazy dog."), various words that differ from the example sentence (e.g., the first modified data 121 may indicate, among other words, "braun", "lumped", "lazie", "lazi", "lizzi", and "lazie"; the second modified data 131 may indicate, among other words, "nimble", "grey", "leaped", "across", "work-shy", "puppy", "spry", "brownish", "slothful", "hound", "fast", "browned", "bound", and "otiose"). The number of these words to sample may be randomized (e.g., one word, five words, all words). Further, each of these words may be associated with a sample location indicative of a location in the first modified data 121 or the second modified data 131 (e.g., "braun" may be the first sample location and "otiose" may be last sample location). The sample locations that will be selected may be randomized In this way, both the number of samples and the words that are selected may be randomized (e.g., if five samples are to be randomly selected, the words "nimble", "across", "brownish", "fast" and "bound" may be selected).

Modifying the input text data 101 or the hierarchical data 111 based on the one or more modified data samples may be performed by replacing text of the input text data 101 or text associated with a node of the hierarchical data 111 with a modified data sample. This replacement may be based on associations in the first modified data 121 or the second modified data 131. For example, if the first modified data 121 or the second modified data 131 includes various words that differ from the example sentence ("The quick brown fox jumped over the lazy dog."), the first modified data 121 and the second modified data 131 may associate each of the various words with its respective word in the example sentence (e.g., "lazie", "lazi", "lizzi", and "lazie" may each be associated with the word "lazy"). In this way, the modified data sampler may determine which word(s) are to be replaced based on a modified data sample.

Additionally, based on the processing performed by the modified data sampler 140, the output data 141 may include one or more modified versions of the input text data 101 or the hierarchical data 111. By including the one or more modified versions, the output data 141 may be indicative of a greater range of speech properties as compared to the input text data 101. For example, the output data 141 may include one or more versions associated with the one or more speakers or accents. The output data 141 may include one or more versions associated with one or more levels of semantic similarity. The number of modified versions may be based on the randomization performed by the modified data sampler 140, based on the first modified data 121, and the second modified data 131. For example, if the randomization performed by the modified data sampler 140 resulted in text based on each of the one or more speakers or accents (e.g., as indicated by the first modified data 121) being sampled, the output data 141 may include a modified version for each of the one or more speakers or accents. If the randomization performed by the modified data sampler 140 resulted in each of the nearest neighbors indicated by the second modified data 131 being sampled, the output data 141 may include a modified version for each of the nearest neighbors.

For example, with respect to the examples of Table I, the output data 141 may include each of the eight examples in either a text form or a hierarchical form. The first four examples of Table I may each be associated with its own speaker or accent. Thus, by including each of the four examples of Table I, the output data 141 may be associated with four different speakers or accents. The fifth through eighth examples of Table I may each be associated with a different one of four nearest neighbors. Thus, by including each of the fifth through eighth examples of Table I, the output data 141 may be associated with at least four different levels of semantic similarity.

In addition to sampling the first modified data 121 and the second modified data 131 based on a randomized process, the sampling may be performed using other processes. For example, the sampling may be performed to select a percentage or other threshold of samples from the first modified data 121 and the second modified data 131. For example, the sampling may be performed such that the output data 141 includes 50% of the first modified data 121 and/or 50% of the second modified data 131. The sampling may be performed such that a threshold number of modified versions of the input text data 101 are included in the output data 141 (e.g., eight modified versions; four modified versions based on the first modified data 121; and/or four modified versions based on the second modified data 131).

After the output data 141 has been determined, the output data 141 may be used as part of an iterative process and provided as input to the first modification pipeline 120 and/or the second modification pipeline 130. For example, the output data 141 as shown by the example framework 100 may be based on the first iteration of the iterative process. Accordingly, for a second iteration, the output data 141 may be sent back through one of the pipelines 120 or 130 for further processing. This process may be repeated one or more times. In this way, the output data 141 may be based on two or more iterations of the first modification pipeline 120 and/or the second modification pipeline 130.

After the output data 141 has been determined based on the processing performed by the modified data sampler 140, the output data 141 may be sent, as input, to one or more speech processing tasks. The example framework shows four example speech processing tasks: a training task performed by the model trainer 150; a validation task performed by the model validator 160, a classification task performed by the classifier 170, a testing task performed by a model tester 180, and a natural language understanding task performed by a natural language engine 190.

For example, if the output data 141 is sent to the classifier 170, the classifier 170 may determine multiple potential classifications based on the output data 141. A classification for the speech data (e.g., speech data 201) may be determined based on which classification was most common in the multiple potential classifications.

As another example, if the output data 141 is sent to the model trainer 150, the model trainer 150 may train a model based on the output data 141. Based on the output data 141, the trainer 150 may be able to train the model using different training data than is stored in a training data set (e.g., speech database 215).

As another example, if the output data 141 is sent to the model validator 160, the model validator 160 may validate a model's performance based on the output data 141. Based on the output data 141, the model validator may be able to validate the model's performance using different validation data than is stored in a validation data set (e.g., speech database 215).

As another example, if the output data 141 is sent to the model tester 180, the model tester 180 may test a model's performance based on the output data 141. Based on the output data 141, the model tester 180 may be able to test the model's performance using different testing data than is stored in a testing data set (e.g., speech database 215).

As another example, if the output data 141 is sent to the natural language engine 190, the natural language engine may perform one or more natural language tasks based on the output data 141. For example, a natural language task may map the output data 141 to an intent (e.g., an intent of the user associated with input text data 101); determine one or more entities indicated by the output data 141 (e.g., determining an amount, date, or time indicated by the output data 141); and/or determine a response based on the output data 141, the intent, and/or the one or more entities (e.g., determine text that answers a question posed by the user in the input text data 101). Based on the output data 141, the natural language engine 190 may be able to determine an intent, entity, or response based on additional, or different, text than is present in the input text data 101. Examples of a natural language tasks include text summarization, question answering, natural language inference. Examples of a natural language engine may be a conversational assistant or chat bot.

Figure 2E:
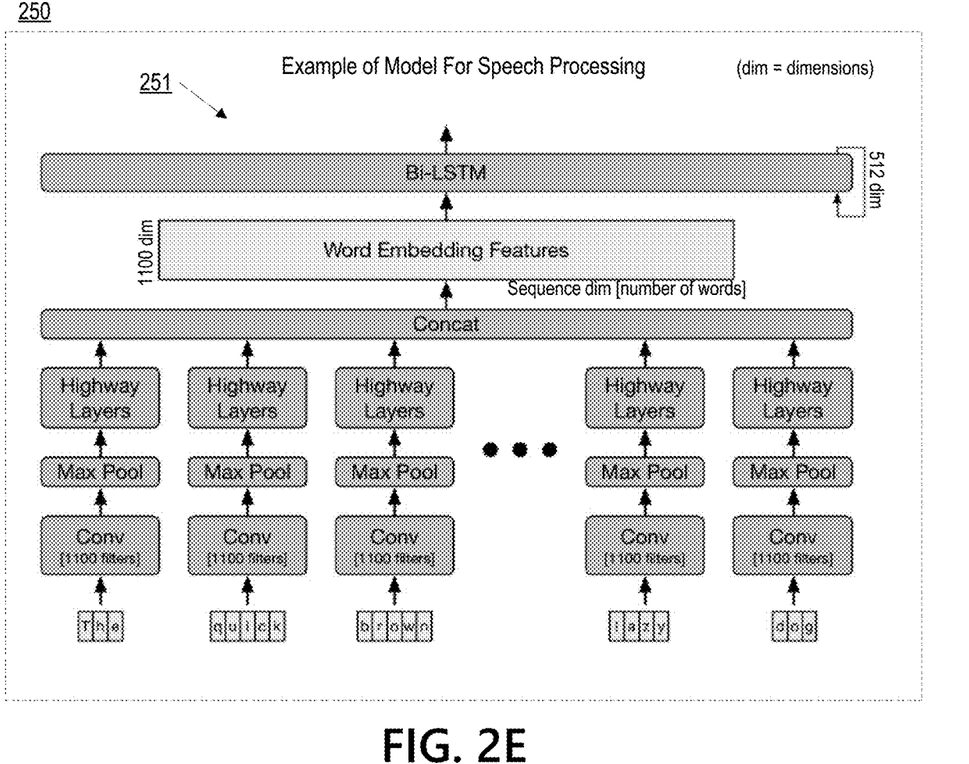

FIG. 2E provides an example 250 of a model that may be trained by the model trainer 150, validated by a model validator 160, or tested by a model tester 180. The model may be configured to output data associated with text summarization, question answering, natural language inference, or the like. As shown in the example 250, the model may be a character-based convolutional neural network (CNN) long short-term memory (LSTM) architecture 251. The character-based CNN LSTM architecture 251 may be configured to receive, as input, text data at the character level. Further, the character-based CNN LSTM architecture 251 may include, among other things, a bi-directional LSTM (Bi-LSTM), word embedding features, a concatenator, one or more highway layers, one or more pooling layers, and one or more convolution layers. Additional details on a character-based CNN LSTM architecture, similar to the architecture 251, can be found in Y. Kim, Y. Jernite, D. Sontag, and A. M. Rush, "Character-aware neural language models", 2015, available at https://arxiv.org/abs/1508.06615.

Figure 2F:
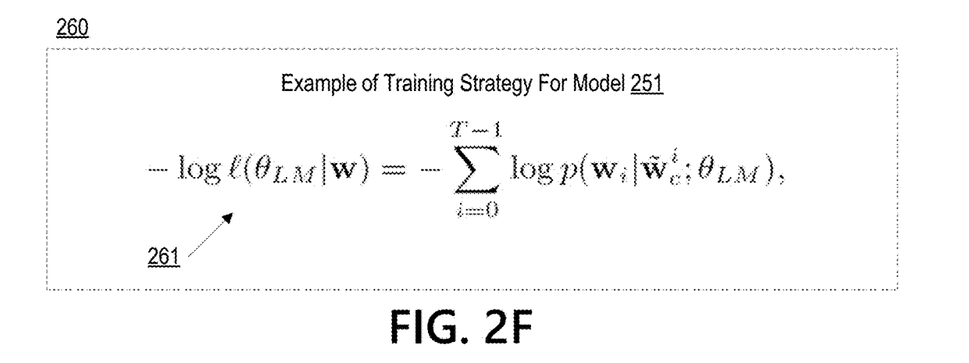

Table II provides example perplexity values that are based on training, validating, and testing the character-based CNN LSTM architecture 251 using different sets of training data, different sets of validation data, and different sets of testing data. Training was performed based on the PTB corpus and was trained using min-batch (batch size=512) stochastic gradient descent with Nesterov momentum, an initial learning rate of 0.25, and manual learning rate annealing. Further, the training procedure is based on a masked language model training procedure. Further details of a masked language model training procedure can be found in J. Devlin, Ming-WeiChang, K. Lee, and K. Toutanova, "Bert: Pre-training of deep bidirectional transformers for language understanding," 2018, https://arxiv.org/pdf/1810.04805.pdf. FIG. 2F provides an example training objective 261 for a masked language model training procedure. The example training objective 261 specifies the contribution of a single sample to the negative log-likelihood. In connection with the example training objective 261, let Wi denote the i-th word in the text sequence $W=[W_0; \ldots; W_{T-1}]$, of length T randomly replace a word Wi with a mask token and then attempt to predict the masked word. $\theta_{LM}$ denotes the language model parameters and $W_c$ denotes the character representation of W with the i-th entry or word having been replaced with the mask token.

In Table II, an entry with "PTB" indicates the baseline training, validation or testing performed to the model. An entry with "Speaker Augmentation" indicates that, for the corresponding speech processing task, training data, validation data, or testing data included data determined based on the first modification pipeline 120 (e.g., using the example 230 of FIG. 2C). An entry with "Semantic Augmentation" indicates that, for the corresponding speech processing task, training data, validation data, or testing data included data determined based on the second modification pipeline 130 (e.g., using the example 240 of FIG. 2D). As seen from the examples of Table II, the model's performance, when trained using the baseline training data degrades when it is validated based on data determined by the example framework 100 (e.g., a perplexity of 206.00). The model's performance improves when the model is trained and validated based on data determined by the example framework 100 (e.g., a perplexity of 73.56). Similar improvements are shown for the perplexity values resulting from testing.

TABLE II

Examples of perplexity values

| Training Data | Validation Data & Testing Data | Example Perplexity For Validation | Example Perplexity For Testing |
|---|---|---|---|
| PTB | PTB | 40.20 | 37.49 |
| PTB | Speaker Augmentation | 110.01 | 92.85 |
| PTB | Semantic Augmentation | 178.55 | 147.71 |
| PTB | Speaker Augmentation, Semantic Augmentation | 206.00 | 170.73 |
| PTB, Speaker Augmentation | PTB | 46.14 | 42.07 |
| PTB, Speaker Augmentation | Speaker Augmentation | 52.86 | 49.09 |
| PTB, Semantic Augmentation | PTB | 49.61 | 45.11 |
| PTB, Semantic Augmentation | Semantic Augmentation | 62.87 | 60.16 |
| PTB, Speaker Augmentation, Semantic Augmentation | PTB | 47.97 | 43.98 |
| PTB, Speaker Augmentation, Semantic Augmentation | PTB, Speaker Augmentation, Semantic Augmentation | 73.56 | 69.52 |

Figure 2G:
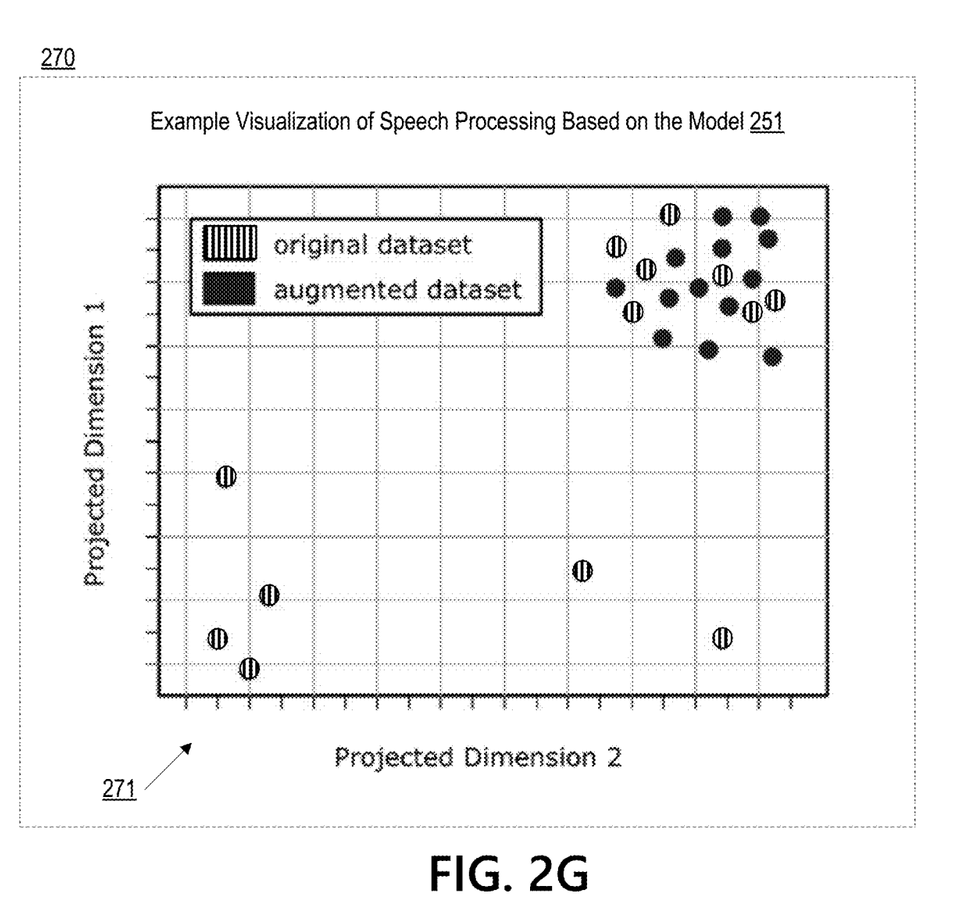

FIG. 2G provides an example 270 of the model's performance based on the original training data (e.g., PTB of Table II) and based on augmented training data (e.g., Speaker Augmentation and/or Semantic Augmentation of Table II). The visual example 270 shows a uniform manifold approximation and projection (UMAP) visualization 271 of embeddings from the character-based CNN LSTM architecture 251. As shown in the UMAP visualization 271, the original training data results in less clustering and additional outliers. The augmented training data provides, comparatively, improved clustering.

Figure 3:
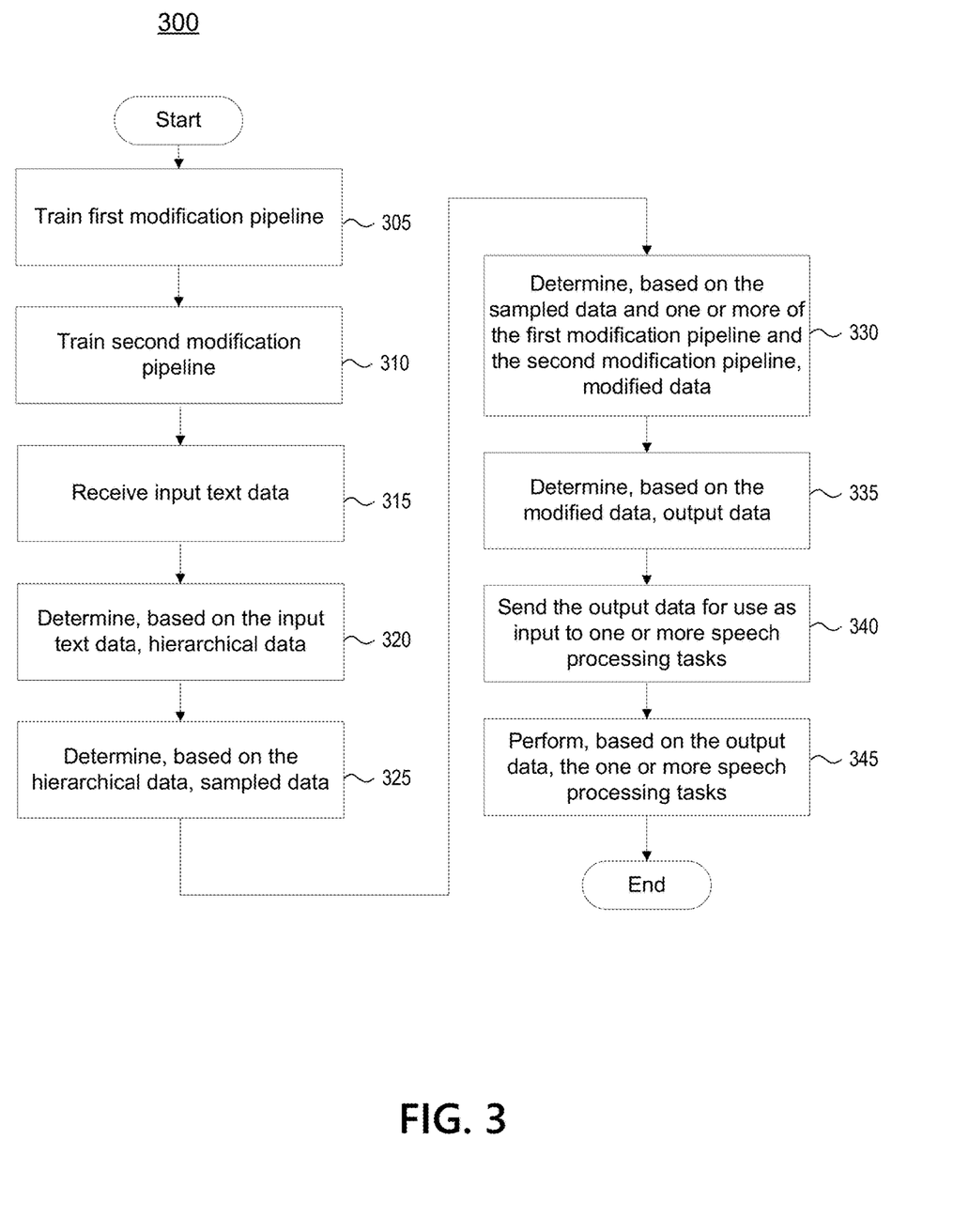
FIG. 3 depicts an example method that may determine input data for speech processing and use the input data as a basis for performing one or more aspects of speech processing.

Having discussed the example framework 100 of FIG. 1, an example method that may be performed by one or more computing devices based on the example framework 100 will be discussed. FIG. 3 depicts an example method that may determine input data for speech processing and use the input data as a basis for performing one or more aspects of speech processing. Method 300 may be implemented by a suitable computing system, as described further herein. For example, method 300 may be implemented by any suitable computing environment, by a computing device, and/or combination of computing devices, such as computing devices 401, 405, 407, and 409 of FIG. 4. Method 300 may be implemented in suitable program instructions, such as in speech processing software 427. Method 300 may also process various sets of training data, such as training set data 129, including for example, when training any model of a modification pipeline (e.g., the first modification pipeline 120; the first modification pipeline 130).

At step 305, one or more computing devices may train a first modification pipeline. Training may be performed so that the first modification pipeline is configured to process its input based on one or more speakers or accents. For example, training the first modification pipeline may include training a text-to-speech converter (e.g., text-to-speech converter 231) to determine audio representative of the one or more speakers and training a speech-to-text converter (e.g., speech-to-text converter 233) to determine output data based on the audio representative of the one or more speakers or accents.

Training the text-to-speech converter may include training one or more model pairs based on one or more speakers or accents. For example, the text-to-speech converter 231 is shown as including one or more model pairs of a Tacotron-2 model and a WaveGlow model. Each model pair may be trained based on data representing speech of a respective speaker or accent. To configure each model pair based on a respective speaker or accent, the Tacotraon-2 model and the WaveGlow model may be trained as in the following example.

In this example, there will be seven different speakers or accent. Each speaker or accent may be represented by a profile of the Carnegie Mellon University (CMU) Arctic dataset. In total, the profiles for the seven different speakers or accents may include five male speakers and two female speakers. Four of the profiles may have United States English accents. The remaining three profiles may include an Indian English accent, a Scottish English accent, and a Canadian English accent. Each profile may include on hour of transcribed and aligned data. Based on these profiles, seven model pairs may be trained.

To initialize the Tacotron-2 and WaveGlow models of a model pair, both the Tacotron-2 and Waveglow models are initially trained on the LJSpeech dataset, which includes 13,100 short audio clips totaling approximately 24 hours of a single speaker reading passages from seven non-fiction books. The initial training may be performed until audio samples containing out of vocabulary words qualitatively sound natural. Initial training of both models may use the ADAM optimization algorithm. Based on the ADAM optimization algorithm, initial training of the Tacotron-2 model using a batch size of 128, a weight decay of 1e-6, and an initial learning rate of 1e-3. Based on the ADAM optimization algorithm, initial training of the WaveGlow model may use a batch size of 32, no weight decay, and an initial learning rate of 1e-4. The initial training of both models may use manual learning rate annealing.

With the initial training complete, the speaker or accent-based training of the Tacotron-2 and Waveglow models of a model pair may be performed. Accordingly, data from one of the seven profiles may be used as a basis for the speaker or accent-based training. For example, the speaker or accent-based training of the Tacotron-2 model may use the ADAM optimization algorithm, use the audio data of the profile as input. For this training, a batch size of 12, an initial learning rate of 1e-5, and a weight decay of 1e-6 may be used. Once the speaker or accent-based training of the Tacotron-2 model is complete, the speaker or accent-based training of the Waveglow model may be performed. For example, the audio of the respective profile may be used as input to the fully trained Tacotron-2 model and the output mel spectrograms may be used as input for training the WaveGlow model. The speaker or accent-based training of the WaveGlow model may use the ADAM optimization algorithm. For this training, a batch size of 8, an initial learning rate of 1e-5, and a weight decay of 1e-6 may be used. The speaker or accent-based training of both models may use manual learning rate annealing.

This process of initial training and speaker or accent-based training may be repeated for each model pair. When training is complete, the first modification pipeline of this example may include seven trained model pairs and each model pair may determine audio data representative of its respective speaker or accent.

The speech-to-text converter of the first modification pipeline may be trained. In the example 230 of FIG. 2C, the speech-to-text converter 233 includes a DeepSpeech model. DeepSpeech is open source, and is available in a trained state from MOZILLA CORPORATION.

At step 310, the one or more computing devices may train a second modification pipeline. Training may be performed so that the second modification pipeline is configured to perform a determination that processes its input based on one or more levels of semantic similarity. For example, the example 240 is shown as including a BERT language model 243, BERT embeddings 241, and a ranking algorithm 245. The BERT language model 243 may be trained on BookCorpus and English Wikipedia corpora, totaling 3.3 billion words. The BERT embeddings 241 may be calculated and the look-up table associated with the ranking algorithm 245 may be determined (e.g., by sampling the five nearest neighbors). After training, the second modification pipeline may determine its output based on one or more nearest neighbors.

After training of both the first modification pipeline and second modification pipeline is complete, the one or more computing devices may be configured to perform the remaining steps of the method. At step 315, the one or more computing devices may receive input text data. The input text data may be similar to the input text data 101 discussed in connection with FIGS. 1 and 2A. For example, the input text data may include one or more words determined based on input speech (e.g., speech 201) or one or more words retrieved from a speech data database (e.g., database 215).

At step 320, the one or more computing devices may determine, based on the input text data, hierarchical data. This determination may be performed similar to the discussion of the text sampler 110 of FIG. 1 and FIG. 2B. For example, the hierarchical data may be similar to the hierarchical data 111 of FIG. 1. The hierarchical data may include a nodal or directed graph representation based on the input text data.

At 325, the one or more computing devices may determine, based on the hierarchical data, sampled data. This determination may be performed similar to the discussion of the text sampler 110 of FIG. 1. For example, the sampled data may be similar to the sampled data 112 of FIG. 1. The sampled data may include a subset of text from the input text data 101 and/or a subset of the nodes from the hierarchical data. Further, the sampled data may be based on semantic and/or grammatical information of the hierarchical data.

At 330, the one or more computing devices may determine, based on the sampled data and one or more of the first modification pipeline and the second modification pipeline, modified data. This determination may be performed similar to the discussion of the first modification pipeline 120 and the second modification pipeline 130 of FIG. 1, and the examples of FIGS. 2C and 2D. For example, the sampled data, or a respective portion thereof, may be processed by the first modification pipeline to determine first modified data (e.g., first modified data 121). As compared to the text indicated by the sampled data, the first modified data may indicate one or more different words or spellings from the text indicated by the sampled data. Further, the one or more different words or spellings may have been determined based on the one or more speakers or accents. Thus, the first modified data may be based on the one or more speakers or accents. For the example training that was performed at step 305, the first modified data, based on the first modification pipeline, may be based on the seven speakers or accents and may, for example, indicate text for each of the seven speakers or accents.

As another example, the sampled data, or a respective portion thereof, may be processed by the second modification pipeline to determine second modified data (e.g., second modified data 131). As compared to the text indicated by the sampled data, the second modified data may indicate one or more different, but semantically similar, words from the text indicated by the sampled data. Thus, the second modified data may be based on a semantic similarity with the sampled data. For the example training that was performed at step 310, the second modified data, based on the second modification pipeline, may indicate one or more nearest neighbors (e.g., k nearest neighbors of the example 240) determined based on the look-up table associated with the ranking algorithm.

At 335, the one or more computing devices may determine, based on the modified data, output data. This determination may be performed similar to the discussion of the modified data sampler 140 of FIG. 1. For example, the output data may be similar to the output data 141 determined based on the processing of the data sampler 140. The output data may include one or more modified versions of the input text data (received at step 315) or the hierarchical data (determined at step 320). The output data may include one or more versions associated with the one or more speakers or accents (e.g., the seven speakers or accents, as discussed at step 305 and step 330). The output data 141 may include one or more versions associated with one or more levels of semantic similarity (e.g., the one or more nearest neighbors, as discussed at step 330). In this way, the output data may be indicative of a greater range of speech properties than the input text data.

At step 340, the one or more computing devices may send the output data for use as input to one or more speech processing tasks. For example, as discussed in connection with FIG. 1, speech processing tasks may include model training (e.g., as performed by model trainer 150), model validation (e.g., as performed by model validator 160), classification (e.g., as performed by classifier 170), and model testing (e.g., as performed by model tester 180).

At step 345, the one or more computing devices may perform, based on the output data, the one or more speech processing tasks. For example, performing a classification task based on the output data may include: determining multiple potential classifications based on the output data; and determining a classification for speech data (e.g., speech data 201) based on which classification was most common in the multiple potential classifications. As another example, performing a model training task based on the output data may include training a model based on the output data. Performing a model validation task based on the output data may include validating a model's performance based on the output data. Performing a model testing task based on the output data may include testing a model's performance based on the output data. Training, validating, and testing a model (e.g., model 251) are discussed in greater detail in connection with Table II.

Figure 4:
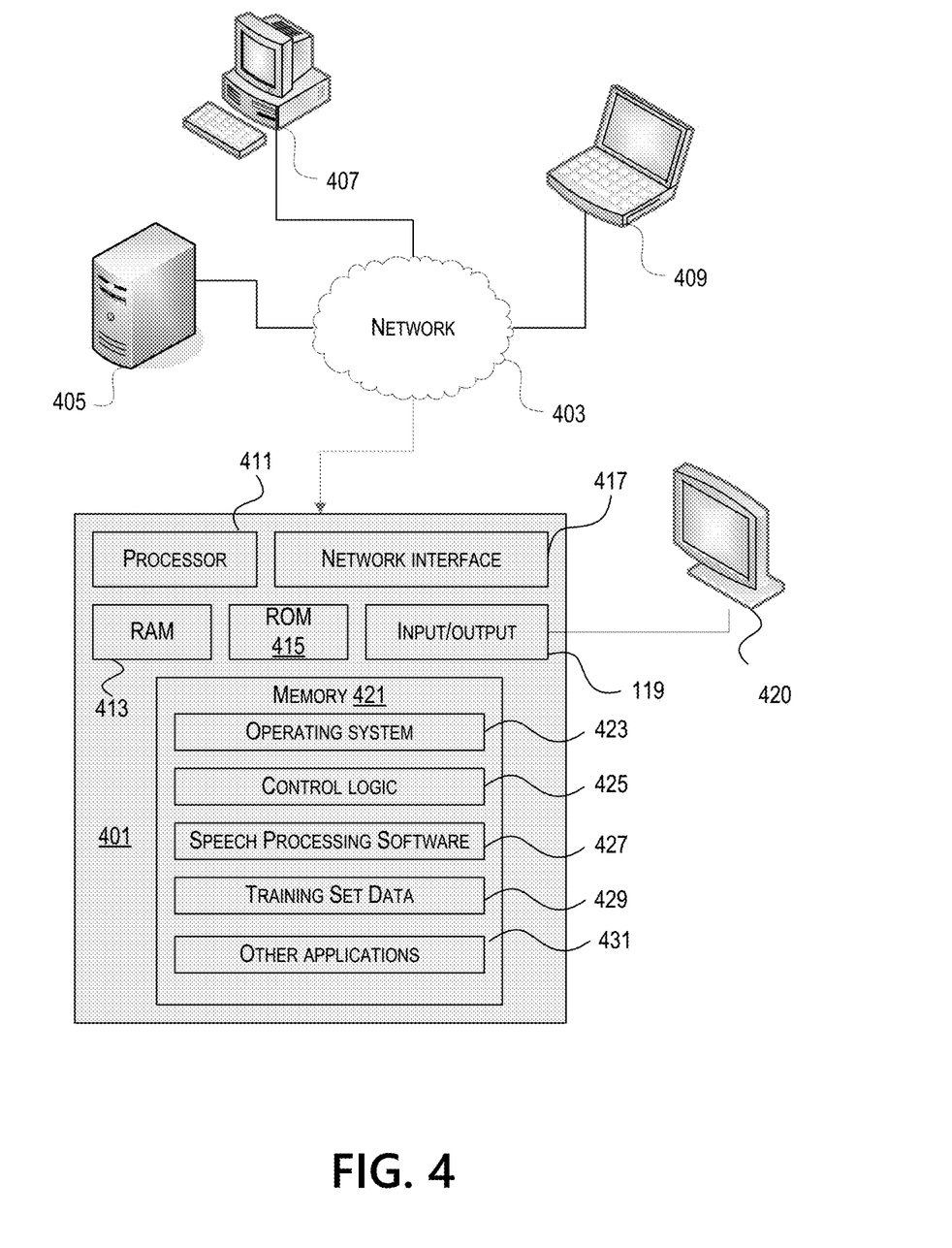
FIG. 4 depicts an example of a computing device that may be used in implementing one or more aspects described herein.

FIG. 4 illustrates one example of a computing device 401 that may be used to implement one or more illustrative aspects discussed herein. For example, computing device 401 may, in some embodiments, implement one or more aspects of the disclosure by reading and/or executing instructions and performing one or more actions based on the instructions. Computing device 401 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 401 may, in some embodiments, operate in a standalone environment. In others, computing device 401 may operate in a networked environment. As shown in FIG. 4, various network nodes 401, 405, 407, and 409 may be interconnected via a network 403, such as the Internet. Other networks may also or alternatively be used, including private intranets, corporate networks, LANs, wireless networks, personal networks (PAN), and the like. Network 403 is for illustration purposes and may be replaced with fewer or additional computer networks. A local area network (LAN) may have one or more of any known LAN topology and may use one or more of a variety of different protocols, such as Ethernet. Devices 401, 405, 407, 409 and other devices (not shown) may be connected to one or more of the networks via twisted pair wires, coaxial cable, fiber optics, radio waves or other communication media.

As seen in FIG. 4, computing device 401 may include a processor 411, RAM 413, ROM 415, network interface 417, input/output interfaces 419 (e.g., keyboard, mouse, display, printer, etc.), and memory 421. Processor 411 may include one or more computer processing units (CPUs), graphical processing units (GPUs), and/or other processing units such as a processor adapted to perform computations associated with speech processing or other forms of machine learning. I/O 419 may include a variety of interface units and drives for reading, writing, displaying, and/or printing data or files. I/O 419 may be coupled with a display such as display 420. Memory 421 may store software for configuring computing device 401 into a special purpose computing device in order to perform one or more of the various functions discussed herein. Memory 421 may store operating system software 423 for controlling overall operation of computing device 401, control logic 425 for instructing computing device 401 to perform aspects discussed herein, speech processing software 427, training set data 429, and other applications 429. Control logic 425 may be incorporated in and may be a part of speech processing software 427. In other embodiments, computing device 401 may include two or more of any and/or all of these components (e.g., two or more processors, two or more memories, etc.) and/or other components and/or subsystems not illustrated here.

Devices 405, 407, 409 may have similar or different architecture as described with respect to computing device 401. Those of skill in the art will appreciate that the functionality of computing device 401 (or device 405, 407, 409) as described herein may be spread across multiple data processing devices, for example, to distribute processing load across multiple computers, to segregate transactions based on geographic location, user access level, quality of service (QoS), etc. For example, devices 401, 405, 407, 409, and others may operate in concert to provide parallel computing features in support of the operation of control logic 425 and/or speech processing software 427.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A method comprising:
   receiving, by one or more computing devices, input text data;
   determining, by the one or more computing devices, based on the input text data, hierarchical data;
   determining, by the one or more computing devices, based on the hierarchical data, sampled data;
   determining, based on processing the sampled data via a first modification pipeline, first modified data, wherein:
      processing the sampled data via the first modification pipeline is performed based on processing the sampled data via a text-to-speech converter to determine audio data and processing the audio data via a speech-to-text converter, wherein the text-to-speech converter comprises one or more model pairs that have been trained based on one or more speakers or accents;
   determining, based on processing the sampled data via a second modification pipeline, second modified data, wherein processing the sampled data via the second modification pipeline is performed based on one or more levels of semantic similarity and based on a language model different from the one or more model pairs;
   determining, by the one or more computing devices, based on the first modified data and the second modified data, output data; and
   sending, by the one or more computing devices, the output data for use as input to one or more speech processing tasks.

2. The method of claim 1, further comprising:
   configuring the first modification pipeline by training, based on the one or more speakers or accents, the one or more model pairs;
   wherein the first modified data comprises one or more first words that are based on the one or more speakers or accents; and
   wherein the one or more first words are different from any word indicated by the sampled data.

3. The method of claim 2, wherein the one or more model pairs include a Tacotron-2 model and a WaveGlow model;
   wherein training the one or more model pairs is performed based on training the Tacotron-2 model based on a particular speaker or accent of the one or more speakers or accents; and
   wherein training the one or more model pairs is performed based on training the WaveGlow model based on the particular speaker or accent.

4. The method of claim 1, wherein the second modification pipeline comprises a Bidirectional Encoder Representations from Transformers (BERT) language model, BERT embeddings, and a look-up table;
   wherein the method further comprises configuring the second modification pipeline by training the BERT language model, determining the BERT embeddings, and determining the look-up table; and
   wherein the second modified data comprises one or more second words that are based on the BERT language model.

5. The method of claim 1, wherein the input text data is determined based on speech data received via a microphone.

6. The method of claim 1, wherein the input text data is retrieved from a speech data database.

7. The method of claim 1, wherein the output data is based on two or more iterations of the first modification pipeline or the second modification pipeline.

8. The method of claim 1, wherein the first modified data is based on two or more iterations of the first modification pipeline, and wherein the second modified data is based on two or more iterations of the second modification pipeline.

9. The method of claim 1, wherein the speech processing task comprises a training task for a model, and wherein the method further comprises:
   performing the training task based on the output data.

10. The method of claim 9, wherein the model comprises a character-based convolutional neural network (CNN) long short-term memory (LSTM) architecture.

11. The method of claim 1, wherein the speech processing task comprises a validation task for a model, and wherein the method further comprises:
    performing the validation task based on the output data.

12. The method of claim 1, wherein the speech processing task comprises a testing task for a model, and wherein the method further comprises:
    performing the testing task based on the output data.

13. The method of claim 1, wherein the speech processing task comprises a classification task, and wherein the method further comprises:
    performing the classification task based on the output data.

14. A system comprising:
    one or more computing apparatuses comprising: one or more processors; and memory storing instructions that, when executed by the one or more processors, cause the one or more computing apparatuses to:
    receive input text data,
    determine, based on the input text data, hierarchical data,
    determine, based on the hierarchical data, sampled data,
    determine, based on processing the sampled data via a first modification pipeline, first modified data, wherein:
       processing the sampled data via the first modification pipeline is performed based on processing the sampled data via a text-to-speech converter to determine audio data and processing the audio data via a speech-to-text converter, wherein the text-to-speech converter comprises one or more model pairs that have been trained based on one or more speakers or accents, determine, based on processing the sampled data via a second modification pipeline, second modified data, wherein processing the sampled data via the second modification pipeline is performed based on one or more levels of semantic similarity and based on a language model different from the one or more model pairs, determine, based on the first modified data and the second modified data, output data, and send the output data for use as input to one or more speech processing tasks; and a database storing training data usable to configure the first modification pipeline and the second modification pipeline.

15. The system of claim 14, wherein the instructions, when executed by the one or more processors, cause the one or more computing apparatuses to:

configure the first modification pipeline by training, based on the one or more speakers or accents, the one or more model pairs;

wherein the first modified data comprises one or more first words that are based on the one or more speakers or accents; and wherein the one or more first words are different from any word indicated by the sampled data.

16. The system of claim 15, wherein the one or more model pairs include a Tacotron-2 model and a WaveGlow model;

wherein the training of the one or more model pairs is performed by training the Tacotron-2 model based on a particular speaker or accent of the one or more speakers or accents; and wherein the training of the one or more model pairs is performed by training the WaveGlow model based on the particular speaker or accent.

17. The system of claim 14, wherein the second modification pipeline comprises a Bidirectional Encoder Representations from Transformers (BERT) language model, BERT embeddings, and a look-up table;

wherein the instructions, when executed by the one or more processors, cause the one or more computing apparatuses to configure the second modification pipeline by training the BERT language model, determining the BERT embeddings, and determining the look-up table; and wherein the second modified data comprises one or more second words that are determined based on the BERT language model.

18. The system of claim 14, wherein the speech processing task comprises a training task for a model, wherein the model comprises a character-based convolutional neural network (CNN) long short-term memory (LSTM) architecture, and wherein the instructions, when executed by the one or more processors, cause the one or more computing apparatuses to:

perform the training task based on the output data.

19. One or more non-transitory media storing instructions that, when executed by one or more processors, cause the one or more processors to:

receive input text data;

determine, based on the input text data, hierarchical data;

determine, based on the hierarchical data, sampled data;

determine, based on processing the sampled data via a first modification pipeline, first modified data, wherein:
processing the sampled data via the first modification pipeline is performed based on processing the sampled data via a text-to-speech converter to determine audio data and processing the audio data via a speech-to-text converter, wherein the text-to-speech converter comprises one or more model pairs that have been trained based on one or more speakers or accents;

determine, based on processing the sampled data via a second modification pipeline, second modified data, wherein processing the sampled data via the second modification pipeline is performed based on one or more levels of semantic similarity and based on a language model different from the one or more model pairs;

determine, based on the modified data, output data; and send the output data for use as input to one or more speech processing tasks.

20. The one or more non-transitory media of claim 19, wherein the instructions, when executed by the one or more processors, cause the one or more computing apparatuses to configure the first modification pipeline by training the one or more model pairs based on the one or more speakers or accents;

wherein the first modified data comprises one or more first words that are based on the one or more speakers or accents;

wherein the one or more first words are different from any word indicated by the sampled data;

wherein the second modification pipeline comprises a Bidirectional Encoder Representations from Transformers (BERT) language model, BERT embeddings, and a look-up table;

wherein the instructions, when executed by the one or more processors, cause the one or more processors to configure the second modification pipeline by training the BERT language model, determining the BERT embeddings, and determining the look-up table; and wherein the second modified data comprises one or more second words that are determined based on the BERT language model.

* * * * *